United States Patent [19]
Sim

[11] Patent Number: 5,598,397
[45] Date of Patent: Jan. 28, 1997

[54] OBJECTIVE LENS DRIVE IN AN OPTICAL DISK MECHANISM

[75] Inventor: Song Sim, Seoul, Rep. of Korea

[73] Assignee: Hyundai Electronics Ind. Co., Ltd., Kyeongki-do, Rep. of Korea

[21] Appl. No.: 317,803

[22] Filed: Oct. 4, 1994

[30] Foreign Application Priority Data

Oct. 15, 1993 [KR] Rep. of Korea .................. 1993-21441

[51] Int. Cl.$^6$ ................................ G11B 7/08; G11B 7/09
[52] U.S. Cl. ................... 369/244; 369/44.14; 369/44.21; 359/823
[58] Field of Search ..................... 369/244, 247, 369/248, 44.14, 44.15, 44.16, 44.21, 44.22; 359/814, 823, 824

[56] References Cited

U.S. PATENT DOCUMENTS

| 4,906,831 | 3/1990 | Yomoda et al. | 369/44.14 |
| 5,367,511 | 11/1994 | Aldenhoven et al. | 369/44.14 |

FOREIGN PATENT DOCUMENTS

| 62-234267 | 10/1987 | Japan . | |
| 62-273632 | 11/1987 | Japan | 369/44.14 |
| 63-119026 | 5/1988 | Japan | 369/44.15 |
| 1-37733 | 2/1989 | Japan | 369/44.16 |
| 4-17128 | 1/1992 | Japan . | |
| 5-20703 | 1/1993 | Japan . | |

*Primary Examiner*—Robert S. Tupper
*Assistant Examiner*—David L. Ometz
*Attorney, Agent, or Firm*— Wenderoth, Lind & Ponack

[57] ABSTRACT

An objective lens drive for a laser disk apparatus drives an objective lens in focusing and tracking directions to ensure that a light beam generated from a source such as a laser diode through an optical system correctly focuses on a recording surface of a medium and follows a recording track. Focusing and tracking spring plates are formed by a one-piece spring plate device that is folded back on itself by about 180 degrees at a predetermined location. The device thus occupies little space. Slides and grooves are formed at an actuator base and a carriage, respectively, for tilt adjustment of the objective lens.

14 Claims, 5 Drawing Sheets

5,598,397

OBJECTIVE LENS DRIVE IN AN OPTICAL DISK MECHANISM

BACKGROUND OF THE INVENTION

Optical drive apparatuses generally include audio disk drives, minidisk drives, compact disk drives, compact disk ROM players and the like. All such devices have a disk drive mechanism and an optical pickup device for irradiating a signal recording surface of an optical recording medium to read and write data relative to the recording surface. The pickup device is provided with an objective lens drive for driving an objective lens in focusing and tracking directions, such that a light beam is correctly focused on the recording surface of the medium and follows the recording track. Japanese patent publications Nos. 64-52234, 64-46232 and 01-91330 disclose various types of objective lens drives with hinges, wires and spring plates, respectively. Each such device has respective advantages and disadvantages.

The spring plate drive includes a spring plate formed by a thin treated metallic plate surface or a laminated metal member with adhesive for imparting attenuation. It has been considered difficult to determine how to impart good attenuation. Additionally, mounting or bonding of the spring plate member to an objective lens holder or base is critical. An attempt has been made to minimize the quantity of bonding adhesive to be employed during bonding, since the bonding adhesive may deform the member or cause various other difficulties.

The known spring plate-the drive requires about three to eight plate meters for driving in the focusing and tracking directions. This presents problems in terms of cost of materials and complexity of assembling operations.

SUMMARY OF THE INVENTION

This invention relates to an objective lens drive for a laser disk apparatus for driving an objective lens in focusing and tracking directions, whereby a light beam generated from a source such as a laser diode through an optical system correctly focuses on a recording surface of a medium and follows a recording track.

According to one aspect of the invention, a structure of focusing or tracking springs is provided in one piece from a plastic material in order to avoid the problems of high cost of materials and of complicated assembling operations. Plastic materials inherently have attenuation characteristics, unlike metallic materials, so that it is not necessary to provide a separate member for providing attenuation. A number of plate springs can be injection molded as one piece. Thus, both of the above problems can be overcome.

According to another aspect of the invention, a one-piece structure of focusing and tracking spring plates includes an intermediate portion between the focusing and the tracking springs and is shaped in a novel manner by being folded by approximately 180 degrees, thus occupying a minimal amount of space.

In a still further aspect of the invention, an objective lens can be adjusted after assembly, to correct errors occurring in the parts and during assembly, in two directions.

DETAILED DESCRIPTION OF PREFERRED EMBODIMENTS

Figure 1:
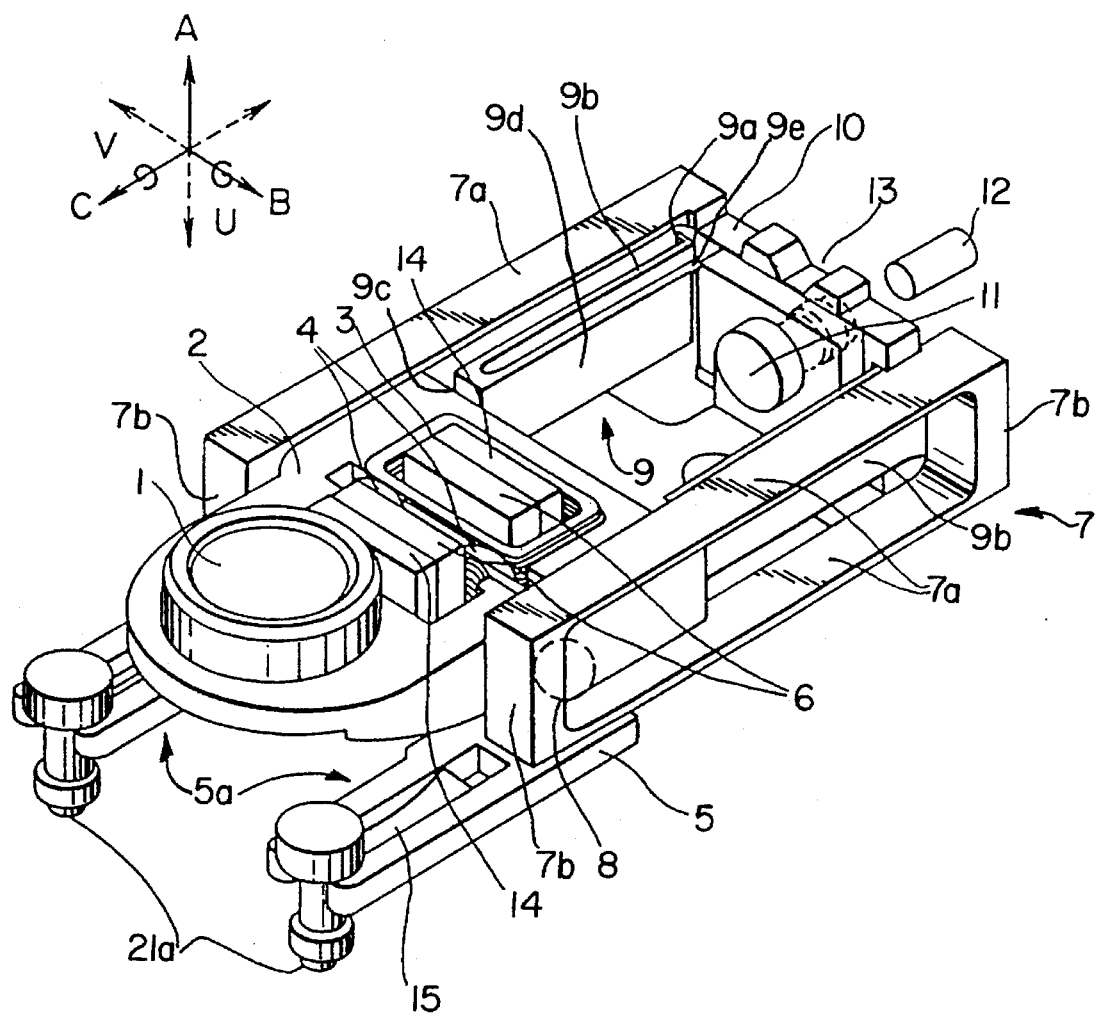
FIGS. 1 and 2 are perspective views of an objective lens drive embodied by the invention, shown assembled and disassembled, respectively.
Figure 2:
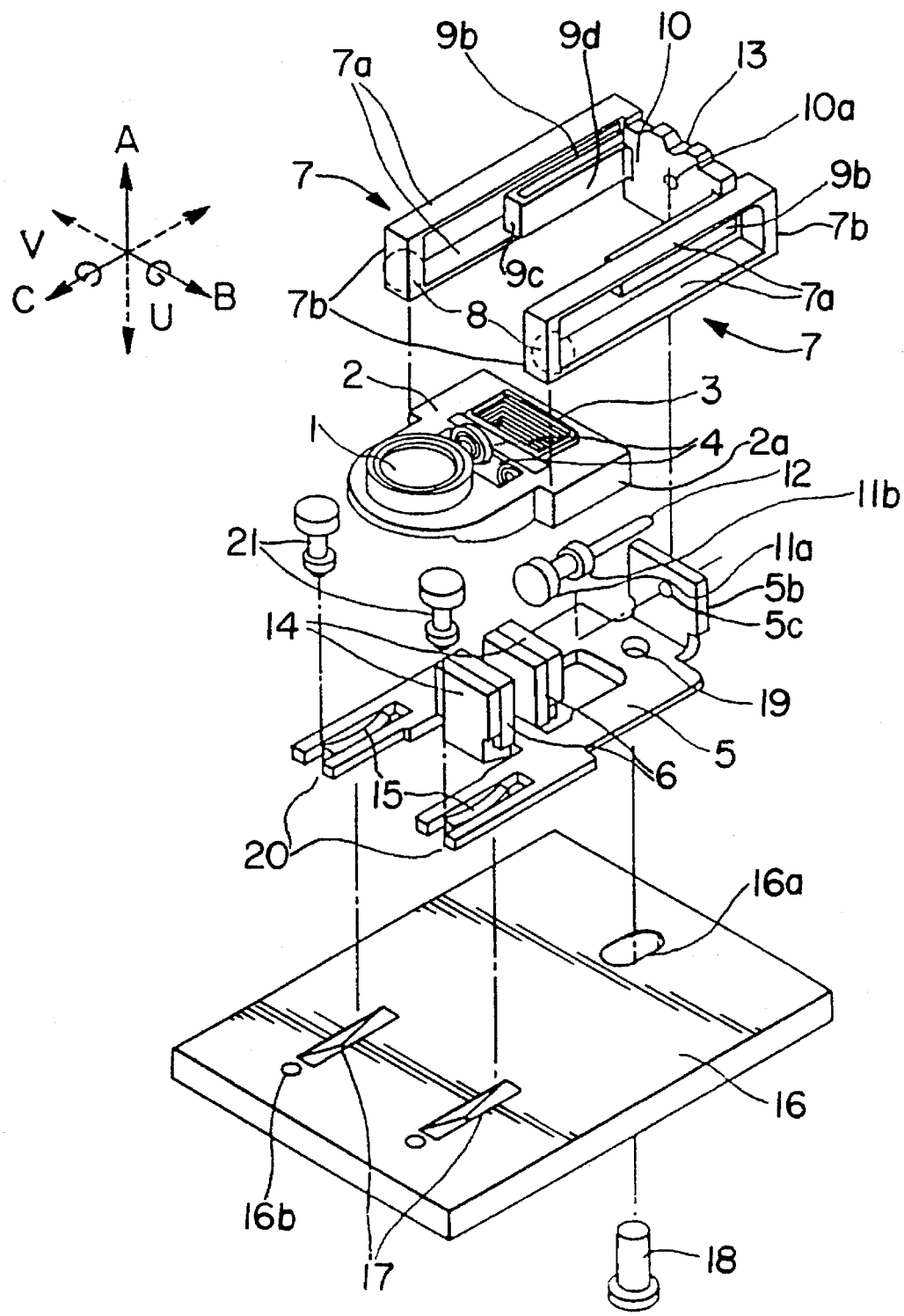

Referring to FIGS. 1 and 2, an objective lens drive includes a holder 2 holding an objective lens 1 for focusing a laser beam on an optical disk. The beam is generated by a laser diode. The holder 2 is provided with focusing and tracking coils 3 and 4 and is disposed on an actuator base 5 having permanent magnets 6 which form a magnetic circuit to thereby generate a kinetic force proportional to current through the coils for displacing the objective lens 1 and holder 2 in focusing and tracking directions A and B. Thus, any displacement of tracks of the optical disk that may be caused by a variety of factors can be absorbed to thus maintain the laser beam in a correct position.

For driving the objective lens in the tilting and tracking directions, the objective lens drive further includes a pair of focusing spring plates 7, each formed substantially in the shape of a rectangle with upper and lower walls or sides 7a being thinner than front and rear walls or sides 7b and bonded at regions 8 to each of lateral shoulders 2a formed at opposite sides of the objective lens holder 2. A pair of tracking springs 9 each is formed in a horizontally extending small thickness band shape. Each tracking spring 9 has a starting end 9a integrally connected to the inside of a respective one of the focusing springs 7, the width dimension of end 9a extending vertically. Extending horizontally from end 9a to a bend or fold 9c is a first band section 9b. A second band section 9d extends generally parallel to first band section 9b to a terminal end 9e connected to a spring plate body 10. Spring plate body 10 is interposed between the pair of tracking springs 9 adjacent terminal ends 9e thereof. A through hole 10a is formed in a center of body 10 relative to opposite sides thereof to which are connected respective ends 9e of the pair of tracking springs 9. A groove 13 is formed in the upper end of body 10 to enable adjustment of tilt in the V direction.

Actuator base 5 has a floor from which permanent magnets 6 and a yoke 14 extend upwardly. At one end of base 5 are a pair of laterally spaced projections 5a, each having therein a mount groove 20 having therein a slide 15 formed as an arcuate downwardly extending projection for use in adjustment of the objective lens in the U direction. To be fitted in mount grooves 20 adjacent respective slides 15 are rubber spring members 21. A tap hole 19 formed in an opposite end of base 5 for use in adjustment of the objective lens in the U direction. A through hole 5c is formed in an upwardly extending terminal end portion or flange 5b. A carriage or support is formed by a flat plate 16 on which the actuator base 5 is disposed. Plate 16 has formed in the upper surface of a front end thereof a pair of arcuately or V shaped recessed grooves 17 for engaging receipt of the slides 15 projecting from the actuator base 5. At an opposite end of plate 16 is formed an elongated hole 16a. A tilt adjusting screw 18 extends through hole 16a and is threaded into tap hole 19 of base 5 for adjustment of tilt of the actuator base 5.

The spring plate body 10 and the actuator base 5 are connected to each other by a rubber spring pin 11 which extends through the holes 10a and 5c formed in the spring plate body 10 and the actuator base. Pin 11 (FIG. 3) has a head 11a greater than the diameter of a pin stem, a shoulder 11b having a diameter smaller than that of the head 11a and having a conical or a funnel shape extending away from head 11a. Such shape is configured appropriately for securing the spring plate body 10 and the actuator base 5 together. Pin 11 further has insertion stem 12 extending from the conical portion of the shoulder, the insertion stem 12 being adapted to be cut away after assembly.

Rubber spring members 21 are shaped similar to the rubber spring 11 for extending through the mount grooves 20 formed in the front end portion of the actuator base 5. Members 21 have lower stem portions 21a to fit in holes 16b formed in plate 16 adjacent respective grooves 17.

The objective lens drive after being assembled is shown in FIG. 1. Tilting of the objective lens must be adjusted in rotary directions U and V about axes B and C, respectively.

For adjusting V direction tilt, an external adjustment member may be inserted into the groove 13 in the upper end of the spring plate body 10. By movement of such member in the direction of axis B, the spring plate body 10 and objective lens holder 2 and objective lens 1 may be rotated in direction V about the rubber spring pin 11. With such tilt adjustment of the objective lens, the position of the center of the objective lens is not changed. Preferably, the rubber spring pin 11 should be positioned along axis C extending through the center point of the objective lens. In the course of such tilt adjustment of the objective lens, the rubber spring 11 functions to define a position of the spring plate body 10 relative to the actuator base 5, to engage such two components, and to define a rotary center or axis for adjustment of V direction tilt.

The actuator base 5 assembled with the spring plates is press formed and carries not only the spring plates but also the permanent magnets 6 and functions as yoke 14 through which a flux passes for adjustment of U direction tilt of the objective lens. The slides 15 in the actuator base 5 are positioned below the objective lens and are press shaped in an arcuate form around the objective lens. Slides 15 are fitted in the V grooves 17 of the carriage 16. This enables a large displacement of the slides 15 within the grooves 17. By turning the adjustment screw 18 in opposite directions, the position of the tap hole 19 is displaced back and forth, thus rotating the actuator base 5 and the objective lens 1 in the U direction about axis B. Thus, the center of the objective lens is not displaced relative to axis B, but nevertheless the objective lens is adjusted in U direction tilt. This requires provision of means for bringing and maintaining the lower faces of the slides 15 in contact with the grooves 17 of the carriage 16. Such preferably should be located at a side of the slides 15 opposite to the tilt adjustment screw 18, and is constituted by the rubber spring members 21 of a configuration similar to rubber spring pin 11 fitting in mount grooves 20 in front of the slides 15 and filling in the mount grooves 20.

Figure 3:
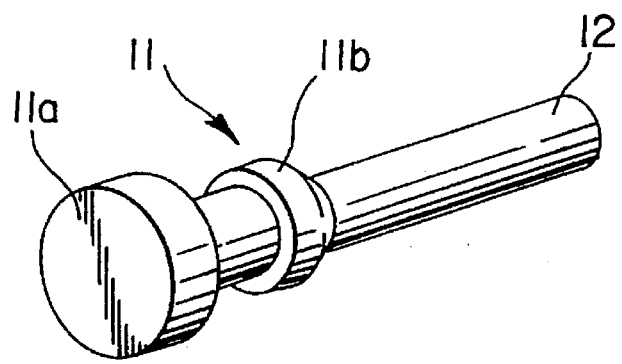
FIG. 3 is a perspective view of a rubber spring used according to the invention.

The spring plates used in the invention may be formed in various configurations other than the configuration shown in FIGS. 1 to 3. Possible varied configurations are shown in FIGS. 4 to 8.

Figure 4:
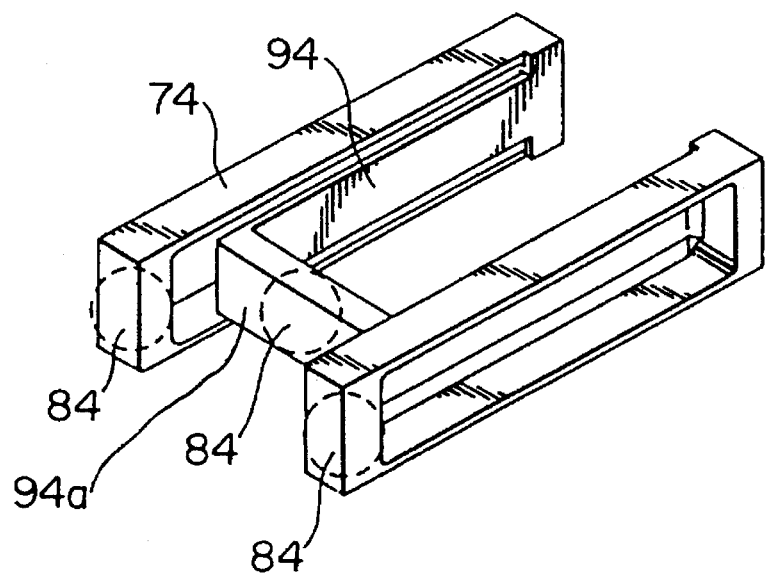
FIGS. 4 to 8 are perspective views of various spring plates embodied by the invention.

A first modification is shown in FIG. 4. Each of a pair of focusing spring plates 74 is formed similar to plates 7 of FIGS. 1 and 2, i.e. by small-thickness bands and thicker end portions arranged in a rectangular configuration. Extending longitudinally from inside of one thicker end portion of each plate 74 is a thin web, thus forming a pair of tracking spring plates 94 connected to each other by a rectangular connection portion 94a. This spring plate device has bonding regions 84 preferably located at thicker end portions of the focusing spring plates 74 and a front face of the connection piece 94a of the tracking spring plates 94.

Figure 5:
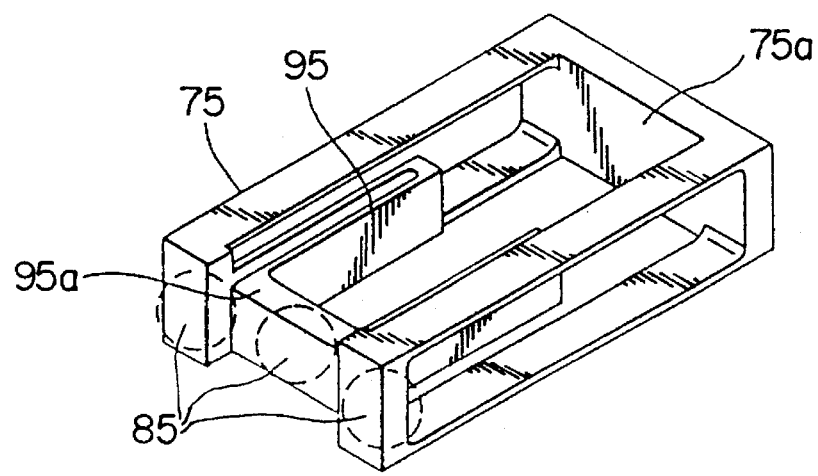

FIG. 5 shows a second modification where a pair of focusing spring plates 75 of rectangular shape formed of small thickness band material have first ends connected by a connection piece 75a. Opposite ends of plates 75 have extending therefrom respective tracking spring plates 95 projecting midway to piece 75a and then bending or folding backwardly as parallel extending portions, with free distal ends thereof being joined by a rectangular projecting connection piece 95a. Bonding regions 85 should preferably by located in thicker end portions of the focusing spring plates 75 and a front face of the connection piece 95a of the tracking spring plates 95.

Figure 6:
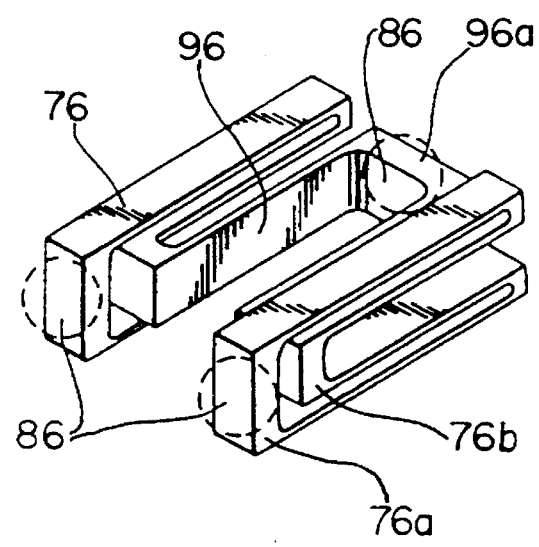

A third modification is shown in FIG. 6. Each of a pair of focusing spring plates 76 is formed by a thin band material shaped in the form of a nested pair of C-shaped members 76a, 76b, each having upper and lower arms joined by a vertical web. Free ends of the upper arms of members 76a, 76b are joined, as are free ends of lower arms thereof. Extending laterally inwardly from each vertical web of each member 76b is a respective connector joined to one end of a respective longitudinal tracking spring plate 96. Opposite ends of plates 96 are joined by a connection piece 96a. Thus, each tracking spring plate 96 is formed integrally with a respective focusing spring plate member 76b. Bonding regions 86 of the spring plate device are located at thick end portions of focusing spring plate members 76a and at a front face of the connection piece 96a.

Figure 7:
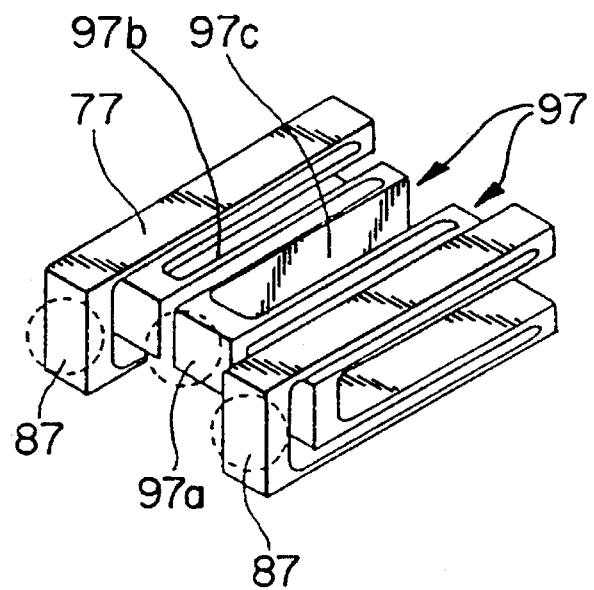

FIG. 7 shows a fourth modification which is similar to the embodiment of FIG. 6 and is formed by a thin band of material. Each of a pair of focusing spring plates 77 is shaped in the same manner as plates 76 of FIG. 6 and has integral therewith a respective tracking spring plate 97. However, opposite ends of plate portions 97b are not joined by a connection piece, but rather are bent or folded rearwardly as inner plate portions 97c, free ends of which are joined by a connection piece 97a. Bonding regions 87 of this spring plate device are located at thick end portions of the focusing spring plates and a front face of the connection piece 97a.

Figure 8:
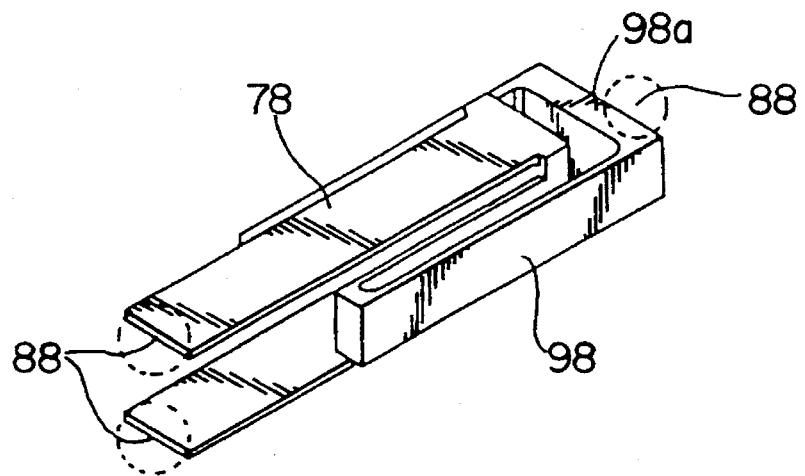

FIG. 8 shows a fifth modification where a thin band material is formed in a C-shape with a vertical web joining two horizontal arms defining a focusing spring plate 78. Extending from opposite sides of the web are a pair of plate portions that are bent outwardly at free ends thereof to form tracking spring plates 98 that extend longitudinally back beyond the web and having free ends that are joined by a connection piece 98a. Bonding regions 88 of this spring plate device are located at free ends of the focusing spring plates 78 and at the connection piece 98a of the tracking spring plates 98.

It is to be understood that the focusing and tracking spring plates can be of one piece structure formed by injection molding, thus dispensing with operations of assembling the plates and with the need for any member to be otherwise added for improving attenuation and any step of adding any such member, since plastic materials have inherently good attenuation characteristics. Conventionally, the spring plate is bonded to a holder at a thin terminal end portion which may be deformed by a bonding agent applied thereto. In accordance with the invention, bonding between the spring plate and holder is made at a thick portion connecting a pair of parallel spring plates, thus avoiding occurrence of such deformation.

The focusing spring plates can be imparted with necessary spring coefficients by being formed as a result of about 180-degree bending or folding relative to the tracking spring plates. This minimizes the size of the spring plate device. This in turn enables the carriage and/or pickup device to be minimized and to be of light weight. This facilitates quick access and efficient utilization of space in the optical disk drive.

The spring plate body 10 is secured to the actuator base 5 by the rubber spring pin 11 that serves the function of enabling rotation for V-direction tilt adjustment of the objective lens. This contributes to simplification of assembly of the device and reduction of the cost of materials. The rubber spring pin 11 is formed as shown in FIG. 3 to include the insertion stem 12 that facilitates assembly and that can be removed after assembly.

The actuator base 5 carries the spring plate device and mounts the permanent magnets 6 that form with the yoke 14 a flux circuit to perform various functions during the course of the U direction tilt adjustment. Thus, a simplified, easy-to-assembly objective lens drive structure with a reduced cost of materials can be provided. The μ direction tilt adjustment slides 15 are press formed in a curvature about the center of the objective lens. Thus, when the actuator base 5 is displaced back and forth by the adjustment screw 18, the objective lens can be tilted without the center thereof being displaced.

According to the invention, an objective lens drive of an optical disk apparatus has focusing and tracking spring plates that are molded as a one-piece structure, thereby dispensing with complicated assembling procedures. Further, the rubber spring pin 11 supports the spring plate body 10 and the actuator base 5. Thereby, support of the spring plates and objective lens and enablement of tilt adjustment of objective lens are achieved together by the same device. The invention provides the advantages of minimization and reduction of the number of necessary components and facilitated adjustment of the objective lens.

What is claimed is:

1. An objective lens drive device for use in an optical disk apparatus to move an objective lens in focusing and tracking directions, said objective lens drive device comprising:

a support including a first end having elongated grooves and said support also including a second end;

an actuator base mounted on said support, said actuator base including a first end having slides positioned in said grooves of said support and said actuator base also including a second end;

a holder to support an objective lens having a center, said holder being mounted on said actuator base;

an adjustment device operable to move said second end of said actuator base toward and away from said support while said slides on said first end of said actuator base slide within said grooves in said first end of said support, thereby tilting said holder in opposite directions about a first axis located at a position to extend through the center of the objective lens to be supported by said holder;

a spring plate device including at least one vertically displaceable focusing spring plate connected to said holder and at least one horizontally displaceable tracking spring plate having a first end integral with said focusing spring plate and a second end secured to a spring plate body; and a rubber spring pin pivotally connecting said spring plate body and said actuator base to enable, upon application of a force to said spring plate body, said spring plate body, said spring plate device and said holder to pivot together relative to said actuator base about a second axis that perpendicularly intersects said first axis at the center of the objective lens to be supported by said holder.

2. An objective lens drive device as claimed in claim 1, wherein said grooves at said first end of said support are V-shaped, and said slides at said first end of said actuator base comprise surfaces that are curved along an arc centered at said first axis.

3. An objective lens drive device as claimed in claim 1, wherein said slides comprise arcuate protrusions projecting downwardly from said first end of said actuator base, and further comprising rubber spring members fitted in respective mounting grooves in said actuator base adjacent respective said slides.

4. An objective lens drive device as claimed in claim 3, wherein each said rubber spring member has a lower stem portion fitting in a respective hole in said support.

5. An objective lens drive device as claimed in claim 1, wherein a hole in said second end of said support is elongated.

6. An objective lens drive device as claimed in claim 1, wherein said rubber spring pin extends through a hole in said spring plate body and through a hole in a flange extending upwardly from said actuator base.

7. An objective lens drive device as claimed in claim 1, wherein said rubber spring pin defines said second axis.

8. An objective lens drive device as claimed in claim 1, wherein said focusing spring plate and said tracking spring plate comprise a unitary one-piece structure.

9. An objective lens drive device as claimed in claim 8, wherein said unitary one-piece structure is formed of a plastic material.

10. An objective lens drive device as claimed in claim 1, comprising two said focusing spring plates, one positioned on each of opposite sides of said holder, and two said tracking spring plates, one each integral with a respective said focusing spring plate.

11. An objective lens drive device as claimed in claim 10, wherein each said tracking spring plate is secured to a respective side of said spring plate body.

12. An objective lens drive device as claimed in claim 10, wherein each said focusing spring plate has a rectangular configuration including upper and lower relatively thin horizontal walls joined at opposite ends thereof by thicker vertical walls, a first said thicker vertical wall being secured to said holder, and said first end of a respective said tracking spring plate extending from a second said vertical wall.

13. An objective lens drive device as claimed in claim 12, wherein each said tracking spring plate comprises two parallel bands extending from said first and second ends thereof and joined at a bend portion spaced therefrom.

14. An objective lens drive device as claimed in claim 1, wherein said second end of said support has therein a hole, said second end of said actuator base has a tap hole, and said adjustment device comprises a screw member extending through said hole and threaded into said tap hole, such that turning said screw member in opposite directions results in movement of said second end of said actuator base.

* * * * *